(12) United States Patent
Luke et al.

(10) Patent No.: US 11,614,698 B2
(45) Date of Patent: Mar. 28, 2023

(54) SEALED PRINT PARTICLE TRANSFER INTERFACE

(71) Applicant: Hewlett-Packard Development Company, L.P., Spring, TX (US)

(72) Inventors: Jeffrey H. Luke, Boise, ID (US); Mathew Craig Lavigne, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 128 days.

(21) Appl. No.: 17/049,114

(22) PCT Filed: Aug. 30, 2018

(86) PCT No.: PCT/US2018/048725
§ 371 (c)(1),
(2) Date: Oct. 20, 2020

(87) PCT Pub. No.: WO2020/046312
PCT Pub. Date: Mar. 5, 2020

(65) Prior Publication Data
US 2021/0237356 A1 Aug. 5, 2021

(51) Int. Cl.
*G03G 15/08* (2006.01)
*B65D 47/00* (2006.01)
*B65D 47/26* (2006.01)
*B65D 83/06* (2006.01)

(52) U.S. Cl.
CPC ....... *G03G 15/0886* (2013.01); *B65D 47/268* (2013.01); *B65D 83/06* (2013.01); *G03G 15/0881* (2013.01); *G03G 2215/0692* (2013.01)

(58) Field of Classification Search
CPC .......... G03G 15/0867; G03G 15/0886; G03G 15/0881; G03G 2215/0692; G03G 2215/0663; B65D 47/26; B65D 47/268; B65D 83/06
USPC .............................. 399/262; 222/556, DIG. 1
See application file for complete search history.

(56) References Cited

U.S. PATENT DOCUMENTS

| 4,304,273 | A | 12/1981 | Caudill et al. |
| 6,209,995 | B1 | 4/2001 | Grune et al. |
| 6,311,745 | B1 | 11/2001 | Welch et al. |
| 6,324,371 | B1 * | 11/2001 | Okiyama ........... G03G 15/0872 399/106 |
| 7,412,192 | B2 | 8/2008 | Nakajima et al. |
| 7,813,678 | B2 * | 10/2010 | Wayman ............ G03G 15/0877 137/449 |

(Continued)

FOREIGN PATENT DOCUMENTS

JP 2013134401 A * 7/2013 ......... G03G 15/0194

*Primary Examiner* — Robert B Beatty
(74) *Attorney, Agent, or Firm* — Foley & Lardner LLP

(57) ABSTRACT

Examples of a print particle transfer interface of a donor container are described herein. Some examples of the print particle transfer interface include a static interface portion to engage a receiving container. The static interface portion includes a static opening. Some examples of the print particle transfer interface include a rotating output assembly with a cylindrical valve seat and a seal component surrounding a valve opening. In some examples, the cylindrical valve seat rotates with respect to the static interface portion to align the valve opening for dispensing print particle to the receiving container.

20 Claims, 5 Drawing Sheets

(56) References Cited

U.S. PATENT DOCUMENTS

| | | | |
|---|---|---|---|
| 8,023,864 B2 * | 9/2011 | Takagi | G03G 15/0898 |
| | | | 399/102 |
| 8,185,229 B2 | 5/2012 | Davidson | |
| 8,417,157 B2 * | 4/2013 | Saito | G03G 15/0872 |
| | | | 399/258 |
| 8,873,996 B1 | 10/2014 | Buchanan et al. | |
| 2008/0212997 A1 | 9/2008 | Sato | |
| 2009/0016767 A1 * | 1/2009 | Koido | G03G 15/0855 |
| | | | 399/106 |
| 2009/0245883 A1 * | 10/2009 | Koido | G03G 15/0855 |
| | | | 399/262 |
| 2012/0219318 A1 | 8/2012 | Yoshida et al. | |
| 2013/0164041 A1 * | 6/2013 | Koyama | G03G 15/0886 |
| | | | 399/260 |
| 2016/0054682 A1 * | 2/2016 | Inui | G03G 15/0886 |
| | | | 399/260 |
| 2016/0161885 A1 | 6/2016 | Hosokawa et al. | |
| 2016/0313674 A1 | 10/2016 | Eto | |
| 2017/0057730 A1 | 3/2017 | Wang et al. | |
| 2017/0269506 A1 * | 9/2017 | Morita | G03G 15/0898 |

* cited by examiner

SEALED PRINT PARTICLE TRANSFER INTERFACE

BACKGROUND

Some types of printing utilize print particles, such as print toner or powder. For example, three-dimensional (3D) printing may utilize one or more kinds of print particles. In some examples of 3D printing, 3D solid parts may be produced from a digital model using an additive printing process. 3D printing may be used in rapid prototyping, mold generation, mold master generation, and short-run manufacturing. Some 3D-printing techniques are considered additive processes because they involve the application of successive layers of build material. In some 3D-printing techniques, the build material may be cured or fused. Laser jet printing may utilize print toner. For example, a printer may cause toner particles to be fused to a piece of paper.

DETAILED DESCRIPTION

Figure 1:
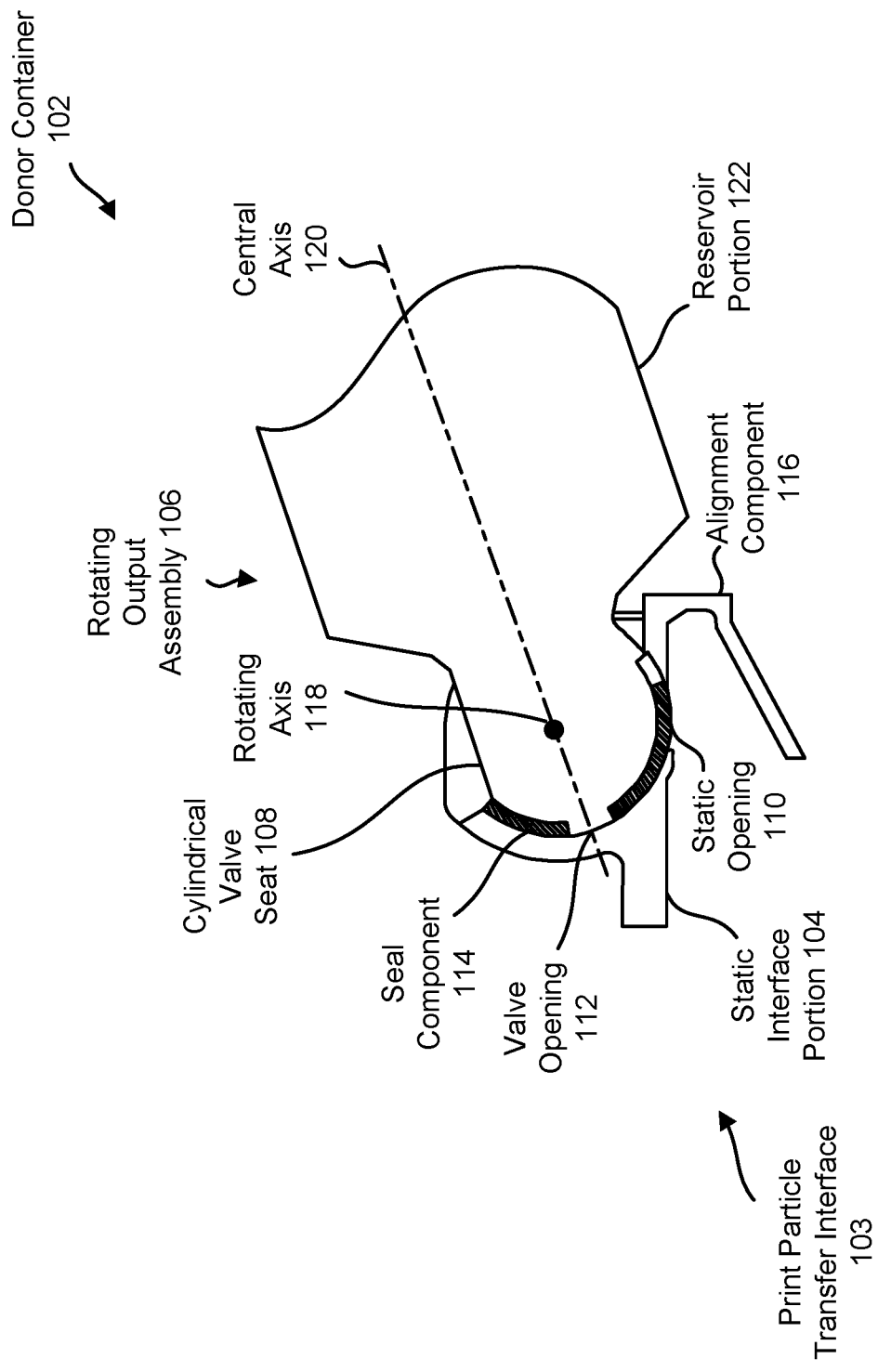
FIG. 1 is a section view of an example of a print particle transfer interface of a donor container.

Some printing technologies utilize print particles. Examples of print particles include three-dimensional (3D) print powder and toner. In some examples, an average diameter of 3D print powder particles of this disclosure may be less than 50 microns and/or an average diameter of toner particles of this disclosure may be less than 20 microns. It should be noted that in some examples, some print particles may be round, approximately round, or non-round.

Print particles may become airborne and contaminate the environment if not controlled. Control may be difficult when print particle bottles are supplied to inexperienced users in environments like offices or homes (e.g., home offices). Flow characteristics of particles may be harder to predict than, for example, fluids. As can be observed from this discussion, devices and techniques that enable cleaner and simpler transfer of print particles may be beneficial.

Ensuring transfer of print particles without releasing untrapped print particles may also be beneficial. For example, it may be beneficial to prevent print particle spillage when transferring print particles from one container to another.

Materials are often transferred from one container to another. Double self-sealing interfaces are used to prevent spilling or contamination. A double self-sealing interface involves two coupling components that engage to facilitate material transfer from one container to another container. Currently, double self-sealing interfaces leave at least a small amount of material untrapped which is released when the coupling mechanism is separated. This untrapped material may be referred to as an untrapped volume.

Also, contamination may occur when materials become trapped when the coupling components are engaged. For example, a trapped volume introduces a contamination risk by introducing air or other contaminants into the system when joining the containers.

The devices and techniques described herein provide for a sealed print particle transfer interface with zero or nearly zero untrapped volume after separation, and no trapped volume to contaminate the system when the print particle transfer interface is joined. The print particle transfer interface described herein facilitates transfer of print particles from one container to another without spilling print particles and contaminating the environment with print particles. The print particle transfer interface also prevents introducing contaminants into the print particle containers. The print particle transfer interface provides for a spill-free double-sided coupling interface that can be quickly mated and separated.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

FIG. 1 is a section view of an example of a print particle transfer interface 103 of a donor container 102. In some examples, the donor container 102 may be a print particle replenishment device. A print particle replenishment device may be a container that holds print particles for donation (e.g., transfer or delivery) to a receiving container. In some examples, the receiving container may be part of a host device (e.g., print cartridge and/or printer).

Examples of the donor container 102 include containers, bottles, syringes, and cartridges. The donor container 102 may contain and/or transfer print particles. For example, the donor container 102 may be designed to interface with a host device. A host device is a device that uses and/or applies print particles. Examples of a host device include printers and print cartridges. For example, it may be beneficial to replenish or refill a printer and/or print cartridge with print particles. For instance, a host device may have a useful life beyond use of a reservoir of print particles. Accordingly, it may be beneficial to replenish the reservoir in a host device with print particles rather than replacing the host device.

Figure 2:
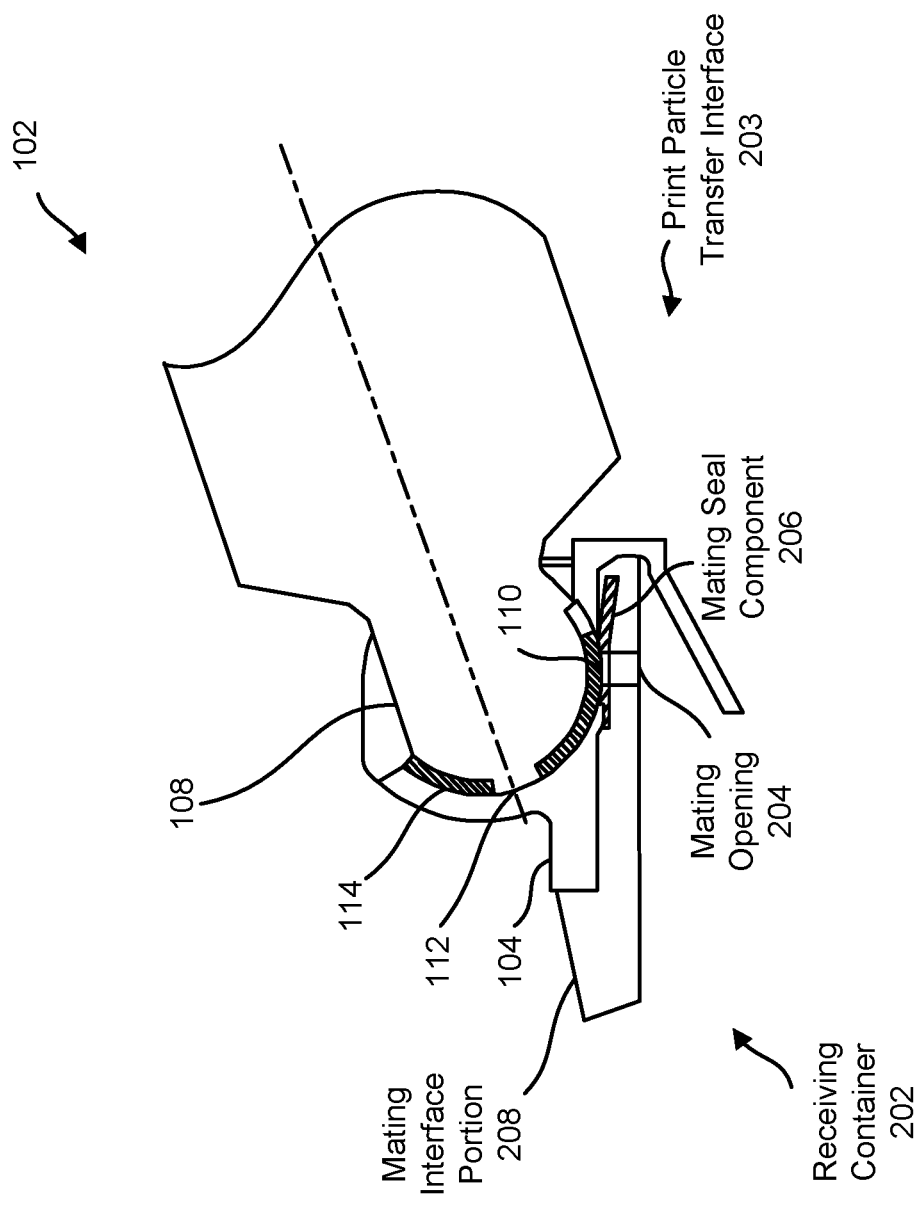
FIG. 2 is a section view of an example of a print particle transfer interface of a receiving container mated with a donor container.

In some examples, a print particle transfer interface 103 may be a portion of the donor container 102 that is adapted to transfer print particles and/or deliver print particles from the donor container 102 to a receiving container. For example, the print particle transfer interface 103 may interface with a receiving container of a host device (e.g., a receptacle of a host device). An example of the donor container 102 mated with a receiving container is illustrated in FIG. 2.

The print particle transfer interface 103 may include a static interface portion 104 to engage a receiving container. In some examples, the static interface portion 104 may be adapted to slide onto a mating interface portion of the receiving container. For instance, the static interface portion 104 may have a planar surface that is adapted to slide into a channel structure of the receiving container. In some examples, the static interface portion 104 may include an alignment component 116 to ensure that the static interface portion 104 aligns with the static interface portion 104 on the receiving container.

The static interface portion 104 may include a static opening 110. For example, the static opening 110 may be an orifice that passes through the planar surface of the static interface portion 104. The static opening 110 may be situated to align with a mating opening of the receiving container when the static interface portion 104 is mated with the receiving container. In some examples, the static opening 110 may be implemented in a variety of shapes (e.g., circular hole, square hole, rectangular hole, oval hole, irregularly shaped hole, etc.).

The print particle transfer interface 103 may also include a rotating output assembly 106. In some examples, the rotating output assembly 106 may include a cylindrical valve seat 108 and a seal component 114 surrounding a valve opening 112.

The cylindrical valve seat 108 may have a partial cylindrical shape. As used herein, the term "cylindrical" may mean approximate conformity to a cylinder shape. For example, the cylindrical valve seat 108 may include one or more portions that conform to or approximate a cylinder shape. For instance, a cylindrical valve seat 108 may include one or more outer curved sections and/or an approximately planar ends. The cylindrical valve seat 108 may have an internal cavity through which print particles may pass.

The cylindrical valve seat 108 may be coupled to a reservoir portion 122 of the donor container 102. The reservoir portion 122 may contain print particles. An opening between the reservoir portion 122 and the cylindrical valve seat 108 may accommodate the flow of print particles from the reservoir portion 122 to the cylindrical valve seat 108.

The static interface portion 104 may include a cylindrical portion that is adapted to house the cylindrical valve seat 108. For example, at least a portion of the static interface portion 104 may have a partial cylindrical shape that forms a cylindrical cavity in which the cylindrical valve seat 108 may be situated. The cylindrical portion of the static interface portion 104 may be sized to accommodate rotation of the cylindrical valve seat 108.

The cylindrical valve seat 108 may be oriented along a rotating axis 118. In some examples, the rotating axis 118 is perpendicular to a central axis 120 of the donor container 102. The rotating axis 118 may be disposed at a distance from the planar surface of the static interface portion 104 that includes the static opening 110.

The cylindrical valve seat 108 may have a valve opening 112 on a curved section of the cylindrical valve seat 108. The valve opening 112 may be an orifice that provides an opening for print particles to pass. In some examples, the valve opening 112 may be implemented in a variety of shapes (e.g., circular hole, square hole, rectangular hole, oval hole, irregularly shaped hole, etc.).

The cylindrical valve seat 108 may rotate with respect to the static interface portion 104 to align the valve opening 112 for dispensing print particle to the receiving container. For example, the cylindrical valve seat 108 may rotate about the rotating axis 118 through a range of angles. The static interface portion 104 may constrain the rotation of the cylindrical valve seat 108. For example, the cylindrical valve seat 108 may contact the static interface portion 104 at the maximum range of rotation. In some examples, rotation of the cylindrical valve seat 108 may be facilitated by exerting a force (e.g., pushing, pulling, etc.) on the reservoir portion 122 of the rotating output assembly 106.

In a closed position, the cylindrical valve seat 108 may be oriented such that the valve opening 112 is blocked by the interior surface of the static interface portion 104. In an open position, the cylindrical valve seat 108 may be oriented such that the valve opening 112 aligns with the static opening 110 to accommodate the flow of print particles out of the donor container 102.

The seal component 114 may be affixed to an exterior surface of the cylindrical valve seat 108. In some examples, the seal component 114 may be bonded to the exterior surface of the cylindrical valve seat 108 with an adhesive (e.g., glue). In other examples, the seal component 114 may be mechanically attached (e.g., press fitted) to the exterior surface of the cylindrical valve seat 108. The seal component 114 may extend around the valve opening 112 without blocking the valve opening 112. In other words, the seal component 114 may have a hole to accommodate the valve opening 112. In some examples, the seal component 114 may extend beyond the valve opening 112 in all directions. In cross section, the seal component 114 may have a curved shape conforming to the curve of the cylindrical valve seat 108.

The seal component 114 may be composed of a compressible material. For example, the seal component 114 may be an elastomer (e.g., rubber), foam, felt, compressed fiber, etc. In some examples, the seal component 114 may be tightly woven and/or manufactured to not allow print particles that are less than 5 microns in diameter to pass through voids or spaces within the material of the seal component 114. In some examples, print particles may transfer into the seal component 114 to some degree and may remain within the seal component 114 without passing through the seal component 114.

The seal component 114 may contact the interior surface of the static interface portion 104. For example, the interior surface of the static interface portion 104 may be sized to remain in contact with the seal component 114 as the cylindrical valve seat 108 and seal component 114 rotate. Therefore, a gap may exist between the interior surface of the static interface portion 104 and the exterior surface of the cylindrical valve seat 108. This gap may be sized such that the seal component 114 remains in contact with the interior surface of the static interface portion 104 during rotation without generating excessive friction. Because the seal component 114 surrounds the valve opening 112, in the closed position, the valve opening 112 may be sealed against the static interface portion 104 by the seal component 114 to prevent print particle transfer.

The seal component 114 may be adapted to protrude through the static opening 110. For example, when the cylindrical valve seat 108 is in a closed position, at least a portion of the seal component 114 may extend through the static opening 110 beyond the planar surface of the static interface portion 104. Because the seal component 114 may protrude through the static opening 110, the seal component 114 may contact a mating seal component of the receiving container through the static opening 110. Therefore, when the donor container 102 is mated with the receiving container, the seal component 114 may create a seal with the mating seal material to prevent trapped volume from contaminating the print particle transfer. In some examples, the donor container 102 may mate with the receiving container when the cylindrical valve seat 108 is in a closed position. This may ensure that the seal component 114 contacts the mating seal material during mating.

During rotation of the cylindrical valve seat 108, the seal component 114 may press against a mating seal component of the receiving container. Because the seal component 114 may be adapted to protrude through the static opening 110, a portion of the seal component 114 may maintain contact with the mating seal component of the receiving container as the cylindrical valve seat 108 and the seal component 114 rotate from a closed position to an open position and back to a closed position. This may ensure that the seal component 114 remains in contact with the mating seal during rotation of the cylindrical valve seat 108.

Figure 3:
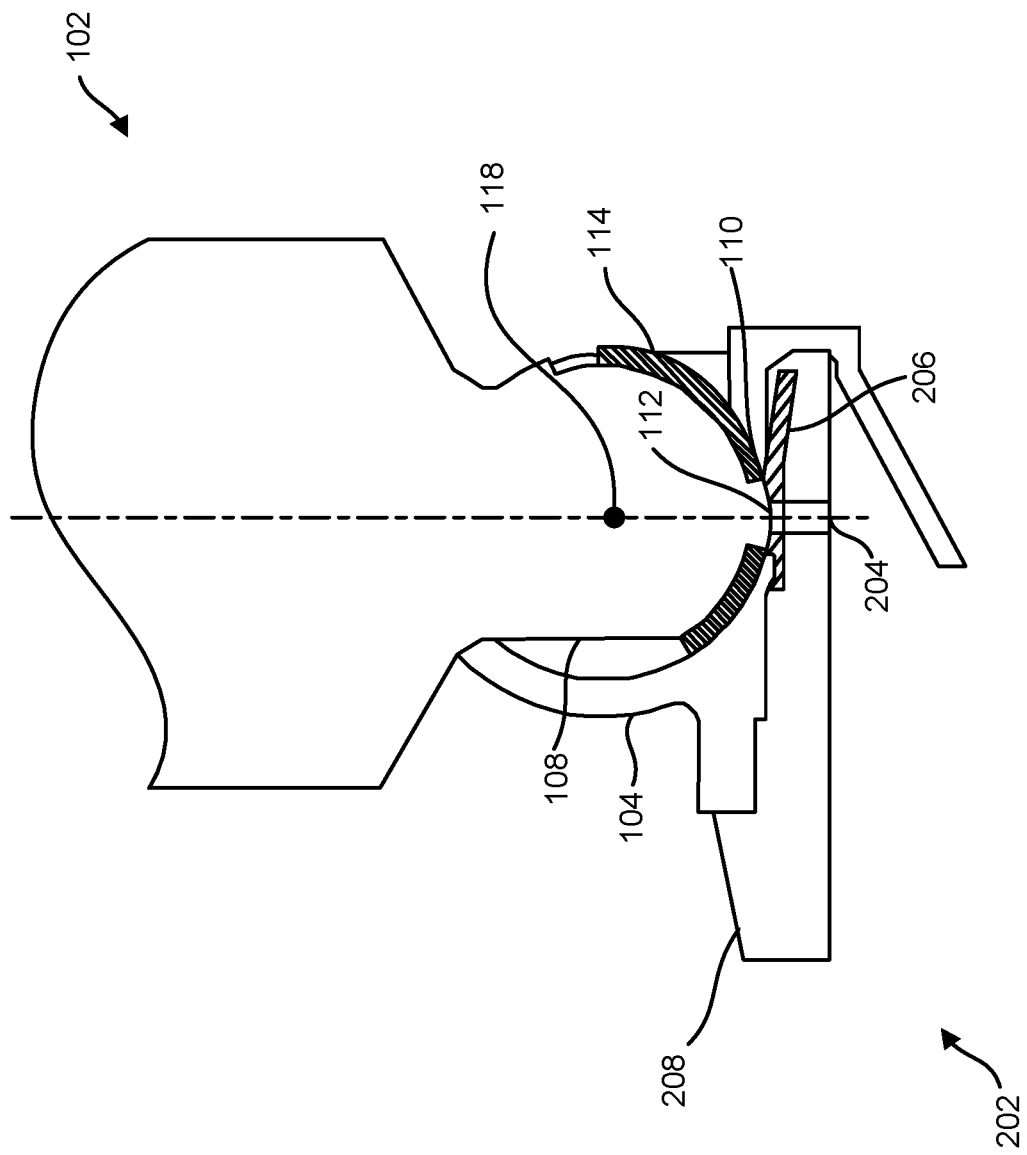
FIG. 3 illustrates an example of the cylindrical valve seat in an open position for print particle transfer.

The seal component 114 may rotate with the cylindrical valve seat 108 to an open position to expose the valve opening 112 to the static opening 110 to permit print particle transfer. An example of the cylindrical valve seat 108 in an open position is illustrated in FIG. 3. When in the open position, the valve opening 112 may align with the static opening 110, which opens the donor container 102 to pass print particles into the mating opening of the receiving container.

The seal component 114 may wipe print particles at the static opening 110 back into the donor container 102 during rotation of the cylindrical valve seat 108 from an open position to a closed position. In this manner, the print particles may be contained within the donor container 102 with zero or near-zero untrapped print particle volume. For example, after completing a print particle transfer, the cylindrical valve seat 108 may be rotated back to a closed position. The rotation of the cylindrical valve seat 108 may cause the seal component 114 to wipe print particles at the print particle interface 103 between the donor container 102 and receiving container back inside the donor container 102. Therefore, no untrapped print particle volume (or an extremely small volume) is left between the donor container 102 and receiving container, after print particle transfer. Beneficially, there is virtually no print particle material to spill upon separation of the donor container 102 and receiving container. No untrapped volume also means no contamination is introduced into the donor container 102 or receiving container when the two containers are joined. Furthermore, the print particle transfer interface allows for rapid mating and disconnecting of the donor container 102 and the receiving container.

FIG. 2 is a section view of an example of a print particle transfer interface 203 of a receiving container 202 mated with a donor container 102. In some examples, the receiving container 202 may be part of a host device (e.g., print cartridge and/or printer).

The print particle transfer interface 203 of the receiving container 202 may include a mating interface portion 208 to engage the static interface portion 104 of the donor container 102. In some examples, the mating interface portion 208 may include a component to accommodate the static interface portion 104 of the donor container 102 to engage the mating interface portion 208. For example, the mating interface portion 208 may include a channel structure into which the static interface portion 104 of the donor container 102 slides.

The print particle transfer interface 203 may also include a mating opening 204 to receive a print particle transfer. The mating opening 204 may be situated to align with the static opening 110 of the donor container 102 when the mating interface portion 208 is mated with the static interface portion 104. In some examples, the mating opening 204 may be implemented in a variety of shapes (e.g., circular hole, square hole, rectangular hole, oval hole, irregularly shaped hole, etc.). The mating opening 204 may accommodate print particle transfer from the donor container 102 into the receiving container 202. For example, print particles may pass through the mating opening 204 into the receiving container 202.

The print particle transfer interface 203 may also include a mating seal component 206 surrounding the mating opening 204. The mating seal component 206 may be affixed to an exterior surface of the mating interface portion 208. In some examples, the mating seal component 206 may be bonded to the exterior surface of the mating interface portion 208 with an adhesive (e.g., glue). In other examples, the mating seal component 206 may be mechanically attached (e.g., press fitted) to the exterior surface of the mating interface portion 208. The mating seal component 206 may extend around the mating opening 204 without blocking the mating opening 204. In other words, the mating seal component 206 may have a hole to accommodate the mating opening 204. The mating seal component 206 may be composed of a compressible material. For example, the mating seal component 206 may be an elastomer (e.g., rubber), foam, felt, compressed fiber, etc. In some examples, the mating seal component 206 may be tightly woven and/or manufactured to not allow print particles that are less than 5 microns in diameter to pass through voids or spaces within the material of the mating seal component 206. In some examples, print particles may transfer into the mating seal component 206 to some degree and may remain within the mating seal component 206 without passing through the mating seal component 206.

The seal component 114 of the donor container 102 may be adapted to mate with the mating seal component 206 of the receiving container 202 to prevent untrapped print particles. In some examples, the seal component 114 of the donor container 102 presses against the mating seal component 206 of the receiving container 202 during mating of the donor container 102 with the receiving container 202. The seal component 114 may be adapted to protrude through the static opening 110. When the donor container 102 is mated with the receiving container 202, the seal component 114 may create a seal with the mating seal component 206 to prevent trapped volume from contaminating the print particle transfer.

As illustrated in FIG. 2, the cylindrical valve seat 108 is in a closed position. In this case, the valve opening 112 of the cylindrical valve seat 108 is not aligned with the mating opening 204. The seal component 114 of the donor container 102 seals against the static interface portion 104 and the mating seal component 206 to prevent print particle transfer.

FIG. 3 illustrates an example of the cylindrical valve seat 108 in an open position for print particle transfer. In this example, the donor container 102 is mated with the receiving container 202. For example, the static interface portion 104 may interface with the mating interface portion 208 as described in FIG. 2.

The cylindrical valve seat 108 of the donor container 102 may rotate with respect to the static interface portion 104 to align the valve opening 112 with the mating opening 204 for dispensing print particle to the receiving container 202. For example, the cylindrical valve seat 108 may rotate about the rotating axis 118 from a closed position to an open position.

When the cylindrical valve seat 108 is in the open position, the valve opening 112 aligns with both the static opening 110 of the static interface portion 104 and the mating opening 204 of the receiving container 202. In the open position, print particles may be free to flow from the donor container 102 into the receiving container 202.

It should be noted that the seal between the seal component 114 of the donor container 102 and the mating seal component 206 may be maintained through the entire rotation of the cylindrical valve seat 108. For example, when in the open position, the seal component 114 of the donor container 102 and the mating seal component 206 of the receiving container 202 may remain in contact to prevent leakage of the print particles at the interface of the static interface portion 104 and the mating interface portion 208. The seal component 114 and the mating seal component 206 may remain in contact (and thus sealed) around the perimeter of the mating opening 204 as the cylindrical valve seat 108 rotates.

Figure 4:
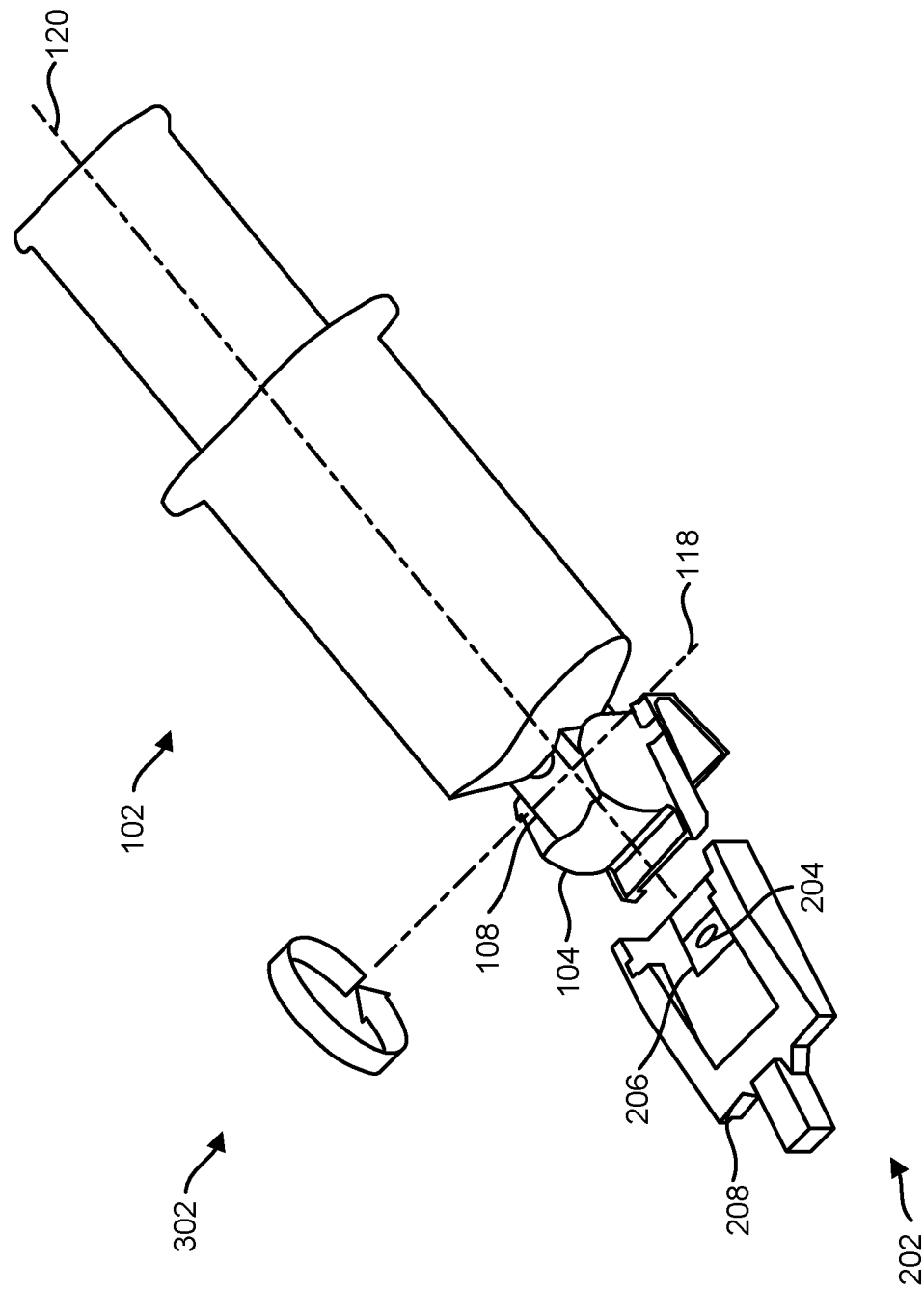
FIG. 4 illustrates an example of a print particle transfer interface assembly.

FIG. 4 illustrates an example of a print particle transfer interface assembly 302. In some examples, the print particle transfer interface assembly 302 may include a donor container 102 and a receiving container 202. It should be noted that the mating interface portion 208 of the receiving container 202 is illustrated. However, for clarity, the remainder of the receiving container 202 (e.g., a receptacle for receiving print particles) is not shown in FIG. 4. The example of FIG. 4 illustrates the donor container 102 and the receiving container 202 in an unmated state.

The receiving container 202 may also include a mating opening 204 that is surrounded by a mating seal component 206. The static interface portion 104 may engage the mating interface portion 208 to align the static opening 110 (not shown) of the static interface portion 104 with the mating opening 204. For example, the static interface portion 104 may slide in a channel structure of the mating interface portion 208. When the static interface portion 104 engages the mating interface portion 208, the seal component 114 (not shown) of the donor container 102 may create a seal to achieve zero or nearly zero untrapped print particle volume.

When the static interface portion 104 and the mating interface portion 208 are mated, the cylindrical valve seat 108 may rotate with respect to the static interface portion 104 to align the valve opening 112 (not shown) of the cylindrical valve seat 108 with the mating opening 204 for dispensing print particle from the donor container 102 to the receiving container 202. The cylindrical valve seat 108 may be oriented along a rotating axis 118. In some examples, the rotating axis 118 is perpendicular to a central axis 120 of the donor container 102.

Figure 5:
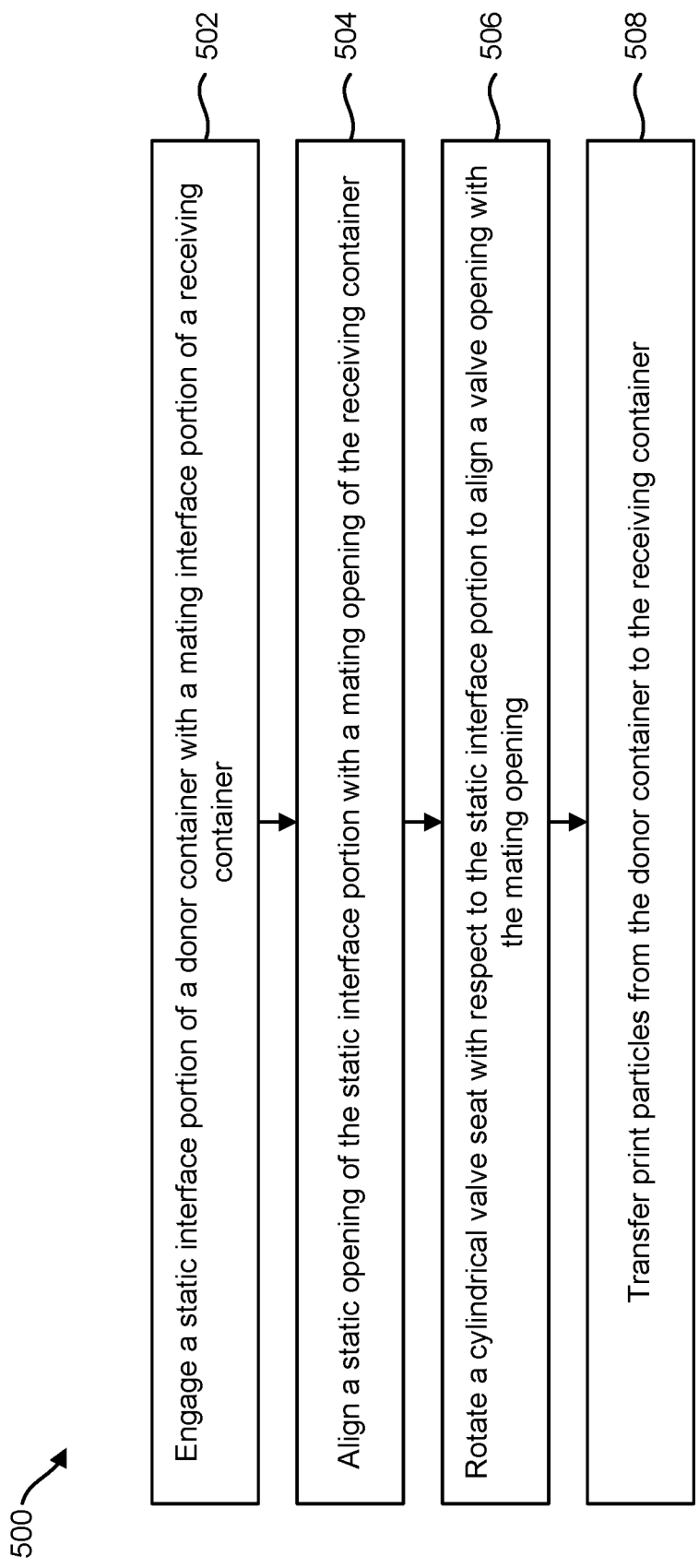
FIG. 5 is a flow diagram illustrating an example of a method for transferring print particles.

FIG. 5 is a flow diagram illustrating an example of a method 500 for transferring print particles. The method 500 may be performed by and/or with at least one of a donor container 102, receiving container 202, and/or print particle transfer interface assembly 302 described herein.

A static interface portion 104 of the donor container 102 may be engaged 502 with a mating interface portion 208 of the receiving container 202. For example, the static interface portion 104 may slide into or otherwise interface with the mating interface portion 208 of the receiving container 202.

A static opening 110 of the static interface portion 104 may be aligned 504 with a mating opening 204 of the receiving container 202. For example, the static opening 110 may be situated to align with the mating opening 204 of the receiving container 202 when the static interface portion 104 is mated with the mating interface portion 208 of the receiving container 202. In some examples, the static opening 110 may align with the mating opening 204 when the static interface portion 104 fully engages the mating interface portion 208.

A seal component 114 of the donor container 102 may mate with a mating seal component 206 of the receiving container 202 when the static interface portion 104 and the mating interface portion 208 are engaged. For example, the seal component 114 may contact the mating seal component 206 through the static opening 110 to prevent untrapped print particles.

A cylindrical valve seat 108 may be rotated 506 with respect to the static interface portion 104 to align a valve opening 112 with the mating opening 204. For example, the seal component 114 may rotate with the cylindrical valve seat 108 to an open position to expose the valve opening 112 to the mating opening 204 to permit print particle transfer.

Print particles may be transferred 508 from the donor container 102 to the receiving container 202. For example, with the valve opening 112 aligned with the mating opening 204, print particles may pass from the donor container 102 into the mating opening 204 of the receiving container 202.

In some examples, the method 500 may also include rotating the cylindrical valve seat 108 from an open position to a closed position. For example, after the print particle transfer is complete, the cylindrical valve seat 108 may be rotated to a closed position. During the rotation, the seal component 114 may wipe print particles at the static opening 110 back into the donor container 102 to contain the print particles within the donor container 102 with zero or near-zero untrapped print particle volume.

The invention claimed is:

1. A print particle transfer interface of a donor container, comprising:
   a static interface portion to engage a receiving container, wherein the static interface portion comprises a static opening, the static interface portion having a static alignment component to overlap a portion of a mating interface portion of the receiving container; and
   a rotating output assembly comprising a cylindrical valve seat and a seal component surrounding a valve opening, wherein the cylindrical valve seat is to rotate with respect to the static interface portion to align the valve opening for dispensing print particle to the receiving container; and
   wherein the seal component is to mate with a mating seal component of the receiving container to prevent untrapped print particles from contaminating the dispensing of the print particle to the receiving container.

2. The print particle transfer interface of claim 1, wherein a rotating axis of the cylindrical valve seat is perpendicular to a central axis of the donor container.

3. The print particle transfer interface of claim 1, wherein the seal component is affixed to an exterior surface of the cylindrical valve seat.

4. The print particle transfer interface of claim 1, wherein the seal component contacts an interior surface of the static interface portion.

5. The print particle transfer interface of claim 1, wherein in a closed position, the valve opening is sealed against the static interface portion by the seal component to prevent print particle transfer.

6. The print particle transfer interface of claim 5, wherein in the closed position, the seal component contacts the mating seal component of the receiving container through the static opening.

7. The print particle transfer interface of claim 1, wherein the seal component is to rotate with the cylindrical valve seat to an open position to expose the valve opening to the static opening to permit print particle transfer.

8. The print particle transfer interface of claim 1, wherein the seal component is to wipe print particle at the static opening into the donor container during rotation of the cylindrical valve seat from an open position to a closed position.

9. The print particle transfer interface of claim 1, wherein the seal component is to press against the mating seal component of the receiving container during rotation of the cylindrical valve seat.

10. The print particle transfer interface of claim 1, wherein the seal component comprises a curved shape conforming to a curve of the cylindrical valve seat.

11. The print particle transfer interface of claim 1, wherein the static alignment component is to align the static interface portion with the mating interface portion.

12. A print particle transfer interface assembly, comprising:
a donor container comprising a static interface portion with a static opening, a cylindrical valve seat and a seal component surrounding a valve opening; and
a receiving container comprising a mating seal component surrounding a mating opening,
wherein the static interface portion is to engage with the receiving container to align the static opening with the mating opening,
wherein the cylindrical valve seat is to rotate with respect to the static interface portion to align the valve opening with the mating opening for dispensing print particle from the donor container to the receiving container,
wherein the seal component is to mate with the mating seal component of the receiving container to prevent untrapped print particles, and
wherein the static interface portion includes a static alignment component to overlap a portion of a mating interface portion of the receiving container.

13. The print particle transfer interface assembly of claim 12, wherein the seal component of the donor container is to press against the mating seal component of the receiving container during mating of the donor container with the receiving container.

14. The print particle transfer interface assembly of claim 12, wherein the seal component is to wipe print particle back into the donor container during rotation of the cylindrical valve seat from an open position to a closed position to contain the print particle within the donor container with zero or near-zero untrapped print particle volume.

15. A print particle transfer interface of a receiving container, comprising:
a mating interface portion to engage a static interface portion of a donor container;
a mating opening to receive a print particle transfer; and
a mating seal component surrounding the mating opening,
wherein a cylindrical valve seat of the donor container is to rotate with respect to the static interface portion to align a valve opening with the mating opening for dispensing print particle to the receiving container,
wherein a seal component of the donor container is adapted to mate with the mating seal component of the receiving container to prevent untrapped print particles from contaminating the dispensing of the print particle to the receiving container, the seal component surrounding the valve opening, and
wherein a portion of the mating interface portion is overlapped by a static alignment component of the static interface portion.

16. The print particle transfer interface of claim 15, wherein the seal component of the donor container is to press against the mating seal component of the receiving container during mating of the donor container with the receiving container.

17. The print particle transfer interface of claim 15, wherein the mating seal component is to contact the seal component of the donor container through a static opening of the donor container.

18. A method, comprising:
engaging a static interface portion of a donor container with a mating interface portion of a receiving container, a portion of the mating interface portion being overlapped by a static alignment component of the static interface portion;
aligning a static opening of the static interface portion with a mating opening of the receiving container, wherein a seal component of the donor container is adapted to mate with a mating seal component of the receiving container to prevent untrapped print particles, the seal component surrounding a valve opening;
rotating a cylindrical valve seat with respect to the static interface portion to align the valve opening with the mating opening; and
transferring print particles from the donor container to the receiving container.

19. The method of claim 18, comprising:
rotating the cylindrical valve seat from an open position to a closed position, wherein the seal component wipes print particle at the static opening back into the donor container to contain the print particle within the donor container with zero or near-zero untrapped print particle volume.

20. The method of claim 18, wherein the seal component rotates with the cylindrical valve seat to an open position to expose the valve opening to the mating opening to permit print particle transfer.

* * * * *